(12) United States Patent
Wu et al.

(10) Patent No.: US 8,339,101 B2
(45) Date of Patent: Dec. 25, 2012

(54) PORTABLE COMPUTER SYSTEM AND RELATED POWER SUPPLY DEVICE AND CHARGING METHOD

(75) Inventors: Te-Lung Wu, Taipei Hsien (TW); Chun-Ta Lee, Taipei Hsien (TW); Chien-Liang Chen, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 350 days.

(21) Appl. No.: 12/775,480

(22) Filed: May 7, 2010

(65) Prior Publication Data
US 2011/0006735 A1 Jan. 13, 2011

(30) Foreign Application Priority Data
Jul. 7, 2009 (TW) ................................ 98122915 A (51) Int. Cl.
*H02J 7/00* (2006.01)
(52) U.S. Cl. ....................................... 320/125; 320/115
(58) Field of Classification Search ................... 320/125
See application file for complete search history.

(56) References Cited

U.S. PATENT DOCUMENTS 6,392,383 B1 * 5/2002 Takimoto et al. ............. 320/115
7,436,149 B2 * 10/2008 Luo et al. ...................... 320/115

FOREIGN PATENT DOCUMENTS

CN 2697930 Y 5/2005
CN 1761123 A 4/2006

* cited by examiner

*Primary Examiner* — Arun Williams
(74) *Attorney, Agent, or Firm* — Winston Hsu; Scott Margo (57) ABSTRACT

A portable computer system includes a host, a power storage device and a dock. The power storage device is installed in the host, for sensing current from a first power socket to a first power terminal to generate a first sensing result, and charging a first rechargeable battery according to a first control signal. The dock is capable of connecting to the host by means of insertion, for sensing current from a second power socket to a second power terminal to generate a second sensing result, and charging a second rechargeable battery according to a second control signal. The dock includes a control device for outputting the first control signal and the second control signal according to the first sensing result and the second sensing result, to control charging operations on the first rechargeable battery and the second rechargeable battery.

18 Claims, 6 Drawing Sheets

PORTABLE COMPUTER SYSTEM AND RELATED POWER SUPPLY DEVICE AND CHARGING METHOD

BACKGROUND OF THE INVENTION

1. Field of the Invention

The present invention relates to a portable computer system and related power supply device and charging method, and more particularly, to a portable computer system and related power supply device and charging method capable of simultaneously enhancing convenience and maintaining normal operations.

2. Description of the Prior Art

With advancement of technology and industry, portable electronic devices, e.g. notebooks, mobile phones, cameras, MP3 players, etc., have been widely used in daily life. For portability, a portable electronic device is equipped with a rechargeable battery, to provide power during operation of the portable electronic device. Since power stored in the rechargeable battery is limited, a user has to replace with another battery having sufficient power or use substitute power source to continue using the portable electronic device once power of the rechargeable battery is exhausted.

Aimed at usage of a notebook, the prior art has disclosed a dock, which includes a rechargeable battery, and connects to the notebook via a special interface, to achieve a dual-battery structure, as well as to reduce replacing frequency of batteries. For example, please refer to FIG. 1, which is a schematic diagram of a notebook 100 according to the prior art. The notebook 100 includes a rechargeable battery 102 and connects to a dock 106 through an interface 104, while other fixing mechanisms are omitted in the drawing for simplicity. The dock 106 mainly includes a rechargeable battery and may include ports of expanding interfaces, such as USB, IEEE 1394, etc. Connecting the notebook 100 to the dock 106 can add an extra rechargeable battery for the notebook 100, such that working time of the notebook 100 can be extended.

Figure 1:
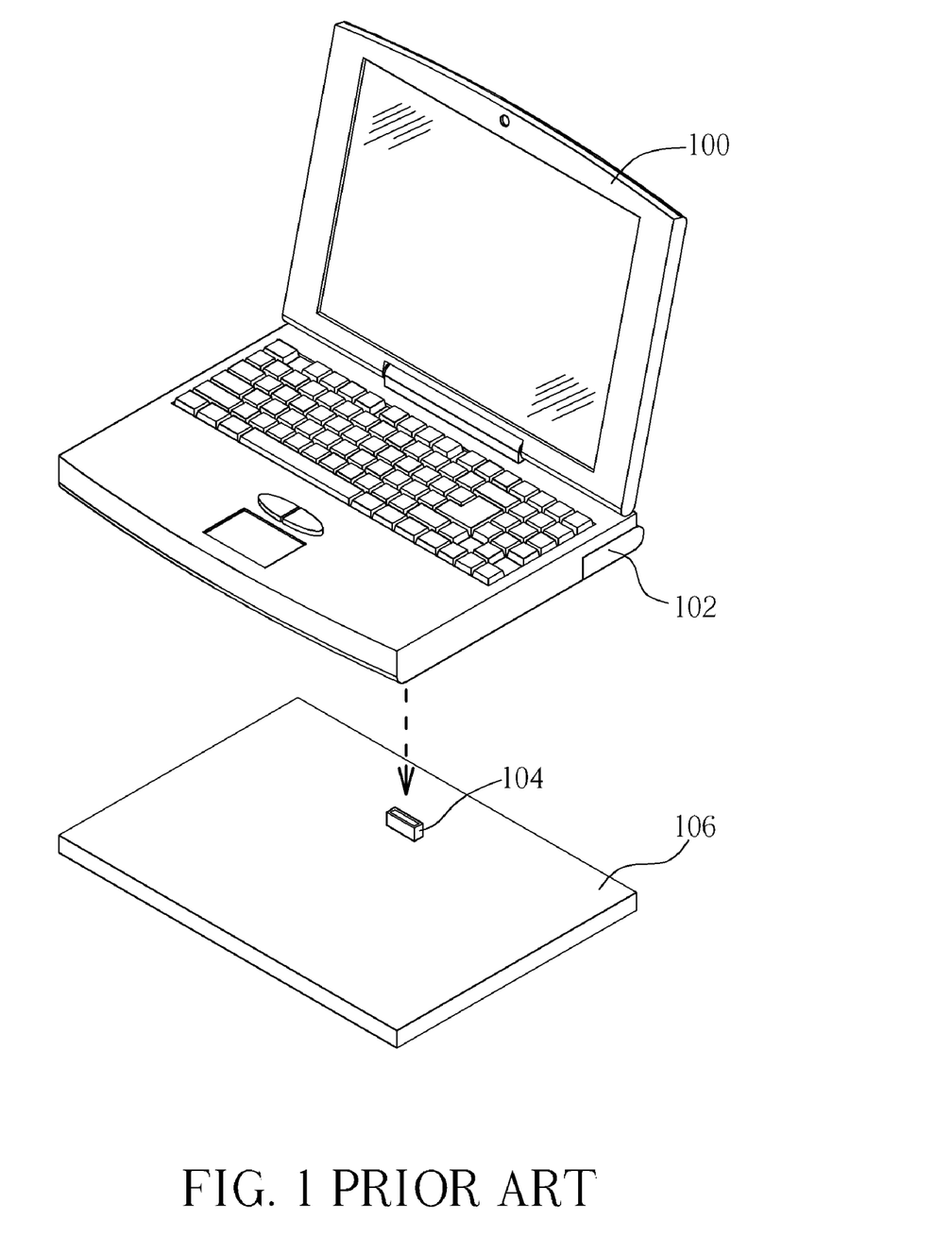
FIG. 1 is a schematic diagram of a notebook according to the prior art.

In general, after the notebook 100 is connected to the dock 106, the notebook 100 sets the rechargeable battery of the dock 106 as a discharger (or power provider), and the rechargeable battery 102 as a power sinker (or battery to be charged). In other words, when the notebook 100 is not connected to an external power source, the rechargeable battery of the dock 106 discharges to the system. After power of the rechargeable battery of the dock 106 is exhausted, the rechargeable battery 102 starts to discharge. On the contrary, when the notebook 106 is connected to an external power supply, the rechargeable battery 102 is charged first, and then the rechargeable battery of the dock 106 in turn, to ensure the rechargeable battery 102 can provide power if the dock 106 is removed instantly. However, since the notebook 100 or the dock 106 can only individually control the related charging circuit and cannot control the other charging circuit, which may result in excessive charging current, and overload a transformer. To avoid such situation, a prior art installs specific mechanism on the dock 106, which is utilized for blocking a power socket of the notebook 100 and only revealing a power socket of the dock 106 when the notebook 100 is connected to the dock 106, to keep a transformer from inserting into the power socket of the notebook 100. Another prior art utilizes a charging control device in a motherboard of the notebook 100 to control charging watts, which may result in unnecessary risk because the interface 104 has to transmit high-voltage power. Besides, the dock 106 cannot be charged when the notebook 100 and the dock 106 are separated, which deteriorates convenience.

SUMMARY OF THE INVENTION

It is therefore a primary object of the present invention to provide a portable computer system and related power supply device and charging method.

The present invention discloses a portable computer system, which includes a host, a power storage device and a dock. The host includes an operating circuit. The power storage device is installed in the host and includes a first power terminal, coupled to the operating circuit, a first power socket, for being inserted a transformer, a first current sensing circuit, coupled between the first power socket and the first power terminal, for sensing current from the first power socket to the first power terminal, to generate a first sensing result, a first rechargeable battery, a first switch, coupled between the first rechargeable battery and the first power terminal, for switching connection between the first rechargeable battery and the first power terminal according to a power capacity of the first rechargeable battery, and a first charging circuit, coupled to the first power terminal and the first rechargeable battery, for charging the first rechargeable battery according to a first control signal. The dock is capable of connecting to the host by means of insertion and includes a second power terminal, coupled to the operating circuit, a second power socket, for being inserted the transformer, a second current sensing circuit, coupled between the second power socket and the second power terminal, for sensing current from the second socket to the second power terminal, to generate a second sensing result, a second rechargeable battery, a second switch, coupled between the second rechargeable battery and the second power terminal, for switching connection between the second rechargeable battery and the second power terminal according to a power capacity of the second rechargeable battery, a second charging circuit, coupled to the second power terminal and the second rechargeable battery, for charging the second rechargeable battery according to a second control signal, and a control device, coupled to the first current sensing circuit, the first charging circuit, the second current sensing circuit and the second charging circuit, for outputting the first control signal and the second control signal according to the first sensing result and the second sensing result, to control the first charging circuit and the second charging circuit.

The present invention further discloses a power supply device for an electronic device, which includes a plurality of power storage devices and a control device. Each power storage device of the plurality of power storage devices includes a power terminal, coupled to a host of the electronic device, a power socket, for being inserted a transformer, a current sensing circuit, coupled between the power socket and the power terminal, for sensing current from the power socket to the power terminal, to generate a sensing result, a rechargeable battery, a switch, coupled between the rechargeable battery and the power terminal, for switching connection between the rechargeable battery and the power terminal according to a power capacity of the rechargeable battery, and a charging circuit, coupled to the power terminal and the rechargeable battery, for charging the rechargeable battery according to a control signal. The control device is coupled to a plurality of current sensing circuits and a plurality of charging circuits of the plurality of power storage devices, and is utilized for outputting a plurality of control signals according to a plurality of sensing results of the plurality of current sensing circuits, to control the plurality of charging circuits.

The present invention further discloses a charging method for an electronic device including a plurality of power storage devices. The charging method includes detecting current received by each power storage device of the plurality of power storage devices, to generate a plurality of sensing results, and controlling charging operations of the plurality of power storage devices according to the plurality of sensing results.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
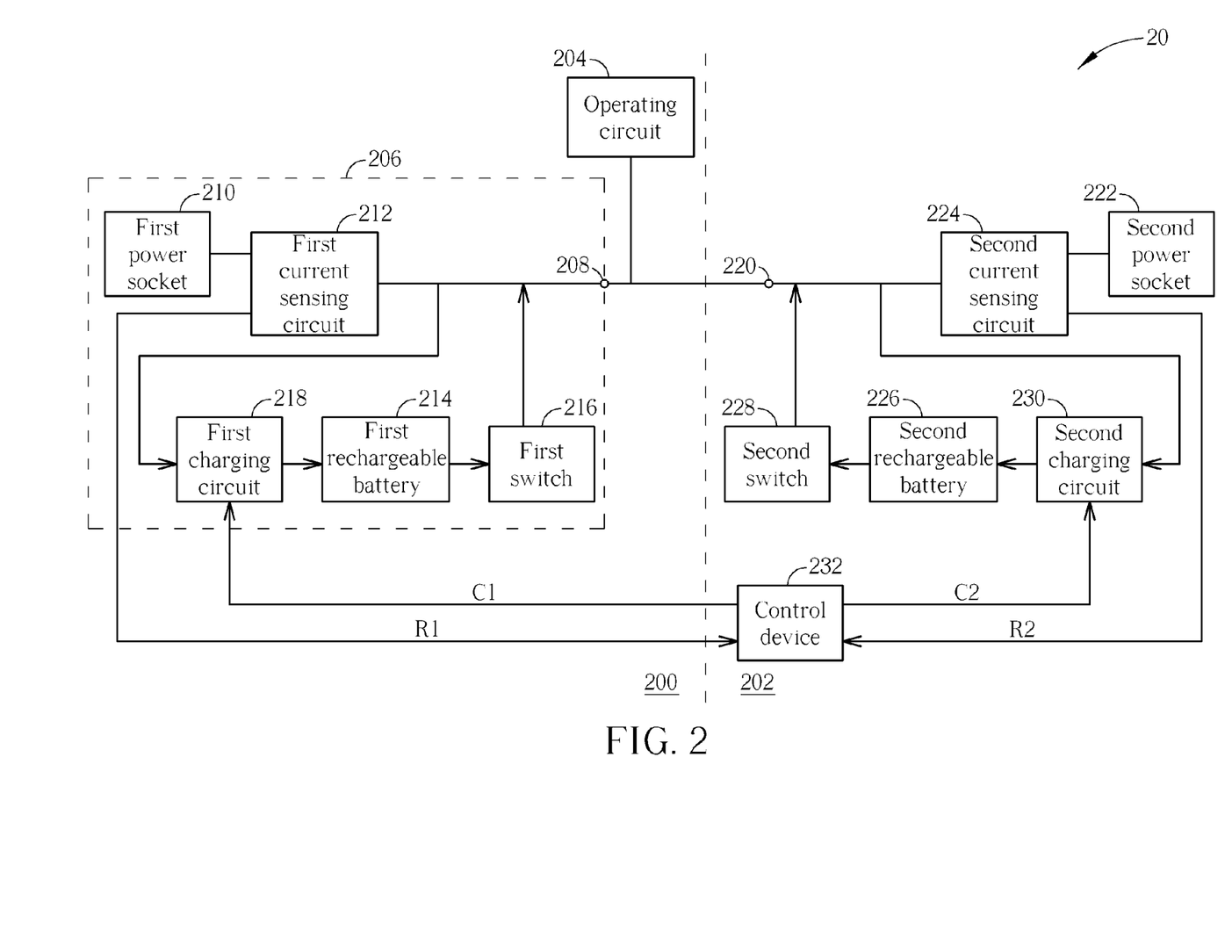
FIG. 2 is a functional block diagram of a portable computer system according to an embodiment of the present invention.

Please refer to FIG. 2, which is a functional block diagram of a portable computer system 20 according to an embodiment of the present invention. The portable computer system 20 includes a host 200 and a dock 202. The host 200 includes an operating circuit 204 and a power storage device 206, and the dock 202 connects to the host 200 by means of insertion, similar to the example shown in FIG. 1. The operating circuit 204 is utilized for realizing functions of the portable computer system 20, and may include a CPU, a memory, a storage device, a display device, an input interface, etc. The power storage device 206 includes a first power terminal 208, a first power socket 210, a first current sensing circuit 212, a first rechargeable battery 214, a first switch 216 and a first charging circuit 218. The first power terminal 208 is utilized for providing power for the operating circuit 204. The first power socket 210 can be inserted an external power source, i.e. an output terminal of a transformer. The first current sensing circuit 212 can sense current from the first power socket 210 to the first power terminal 208, and generate a first sensing result R1. The first charging circuit 218 can charge the first rechargeable battery 214 according to a first control signal C1. The first switch 216 switches connection between the first rechargeable battery 214 and the first power terminal 208 according to a power capacity of the first rechargeable battery 214. The dock 202 includes a second power terminal 220, a second power socket 222, a second current sensing circuit 224, a second rechargeable battery 226, a second switch 228 and a second charging circuit 230. The structure and operating principle of the dock 202 are similar to those of the power storage device 206; in other words, the second power terminal 220 is utilized for providing power to the operating circuit 204, the second power socket 222 can be inserted an output terminal of a transformer, the second current sensing circuit 224 can sense current from the second power socket 222 to the second power terminal 220, and generate a second sensing result R2, the second charging circuit 230 can charge the second rechargeable battery 226 according to a second control signal C2, and the second switch 228 switches connection between the second rechargeable battery 226 and the second power terminal 220 according to a power capacity of the second rechargeable battery 226. In addition, the dock 202 further includes a control device 232, which is utilized for outputting the first control signal C1 and the second control signal C2 to the first charging circuit 218 and the second charging circuit 230, to control operations of the first rechargeable battery 214 and the second rechargeable battery 226. See the following description for detail.

When the host 200 is connected to the dock 202, the host 200 sets the second rechargeable battery 226 as a discharger and the first rechargeable battery 214 as a power sinker. In other words, when the portable computer system 20 is not connected to an external power source, the second rechargeable battery 226 provides power for the operating circuit 204 at first, and the rechargeable battery 214 takes over after the second rechargeable battery 226 runs out. On the contrary, when the host 200 is connected to an external power source, the portable computer system 20 charges the first rechargeable battery 214 at first, and then goes to the second rechargeable battery 226 after the first rechargeable battery 214 is fully charged. Under such condition, since both of the first power socket 210 and the second power socket 222 can connect with a transformer, the related charging operations can be classified in the following two conditions.

Condition 1: if the first power socket 210 is connected with a transformer, DC (direct current) power supplied by the transformer flows from the first power socket 210, via the first current sensing circuit 212, to the first power terminal 208, to supply the operating circuit 204 and the first charging circuit 218, and further output to the second power terminal 220. At this moment, the control device 232 controls the first charging circuit 218 to charge the first rechargeable battery 214 at first via the first control signal C1 and the second control signal C2. Meanwhile, if there is remaining power, i.e. the first sensing result R1 indicates that current flowing from the first power socket 210 to the first power terminal 208 is smaller than a default value, the control device 232 controls the second charging circuit 230 to charge the second rechargeable battery 226 as well. On the contrary, if the first sensing result R1 indicates that current flowing from the first power socket 210 to the first power terminal 208 is greater than the default value, meaning that the transformer may risk overloading, the control device 232 can control the second charging circuit 230 to decrease or stop charging current for the second rechargeable battery 226 accordingly, or further control power consumption of the operating circuit 204, for example, to slow down rotation speed of a fan, minimize CPU speed, etc. Therefore, the present invention can ensure the first rechargeable battery 214 has higher priority to be charged, and avoid the risk of transformer overload, to maintain the normal operation of the system.

Condition 2: if the second power socket 222 is connected with a transformer, DC power supplied by the transformer flows from the second power socket 222, via the second current sensing circuit 224, to the second power terminal 220, to supply the operating circuit 204 and the second charging circuit 230, and further output to the first power terminal 208. At this moment, the control device 232 controls the first charging circuit 218 to charge the first rechargeable battery 214 at first via the first control signal C1 and the second control signal C2. Meanwhile, if there is remaining power, i.e. the second sensing result R2 indicates that current flowing from the second power socket 222 to the second power terminal 220 is smaller than a specific value, the control device 232 controls the second charging circuit 230 to charge the second rechargeable battery 226 as well. On the contrary, if the second sensing result R2 indicates that current flowing from the second power socket 222 to the second power terminal 220 is greater than the specific value, meaning that the transformer may risk overloading, the control device 232 can control the second charging circuit 230 to decrease or stop charging current to the second rechargeable battery 226 accordingly, or further control power consumption of the operating circuit 204, for example, to slow down rotation speed of a fan, minimize CPU speed, etc. Therefore, the present invention can ensure the first rechargeable battery 214 has higher priority to be charged, and avoid the risk of transformer overload, to maintain the normal operation of the system.

Figure 3A:
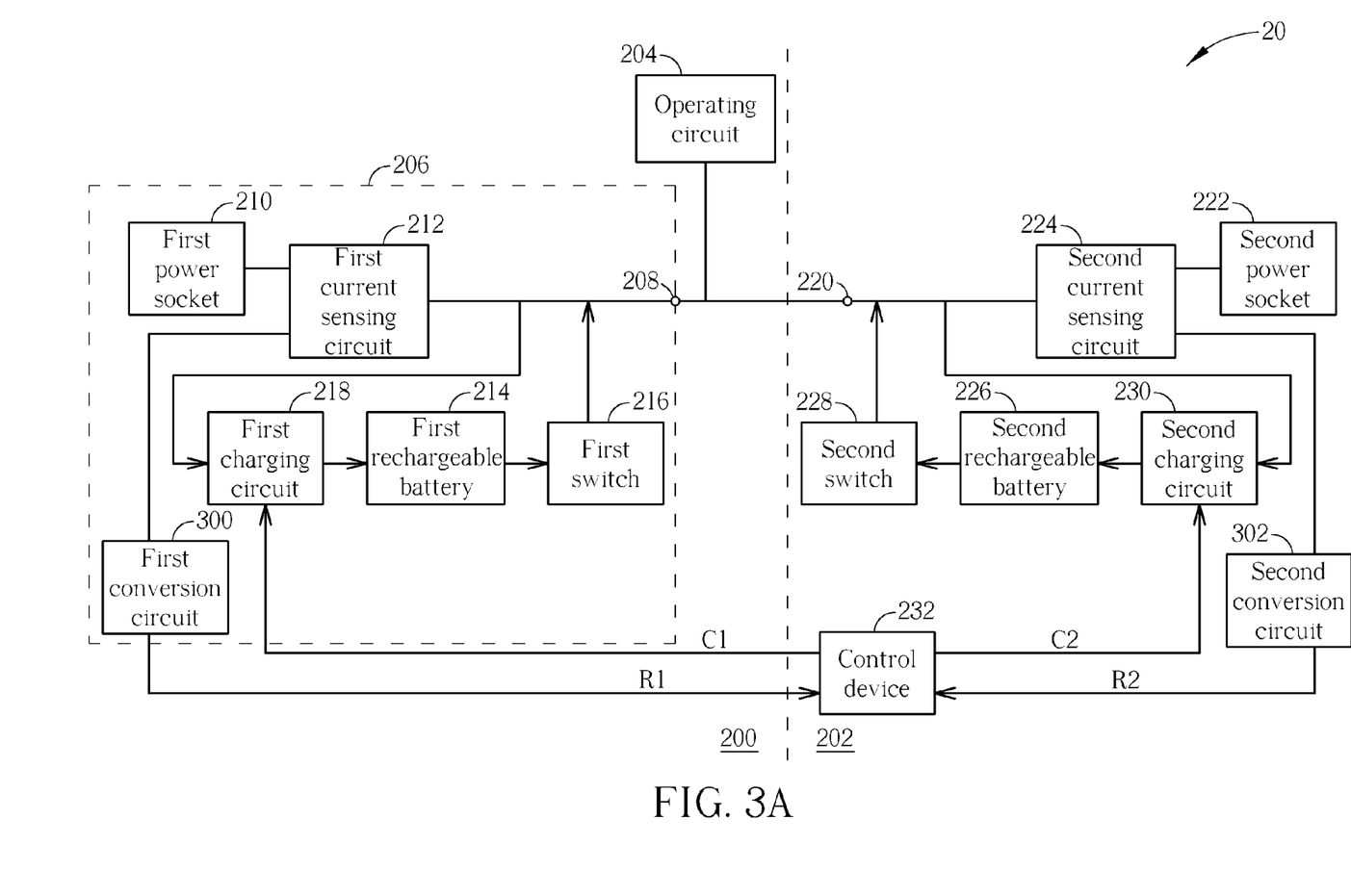
FIG. 3A is a schematic diagram of alteration of the portable computer shown in FIG. 2.

The above two conditions are established upon the requirement of "charging the first rechargeable battery 214 at first", and the concept of the present invention is to detect output current of the transformer and control the charging operation accordingly. Modifications based on the concept still belong to the scope of the present invention, e.g. "charging the second rechargeable circuit 230 at first", "charging a charging circuit already connected with a transformer", etc. Besides, by the same concept, "charging dual batteries simultaneously" can be derived, e.g. the control device 232 controls the first charging circuit 218 and the second charging circuit 230 to charge the first rechargeable battery 214 and the second rechargeable battery 226 simultaneously according to the first sensing result R1 and the second sensing result R2. Noticeably, the portable computer system 20 shown in FIG. 2 is an exemplary embodiment of the present invention, and those skilled in the art can make various alternations accordingly. For example, if a signal level generated by the first current sensing circuit 212 is low, as shown in FIG. 3A, a first conversion circuit 300 can be added between the first current sensing circuit 212 and the control device 232, and a second conversion circuit 302 can be added between the second current sensing circuit 224 and the control device 232, in order to convert or amplify the first sensing result R1 and the second sensing result R2, and ensure the control device 232 correctly gauges output current of the transformer. Furthermore, the first conversion circuit 300 and the second conversion circuit 302 can be integrated into the first charging circuit 218 and the second charging circuit 230 respectively, e.g. to implement the first conversion circuit 300 and the second conversion circuit 302 by spare components in the first charging circuit 218 and the second charging circuit 230, to decrease layout area.

Figure 3B:
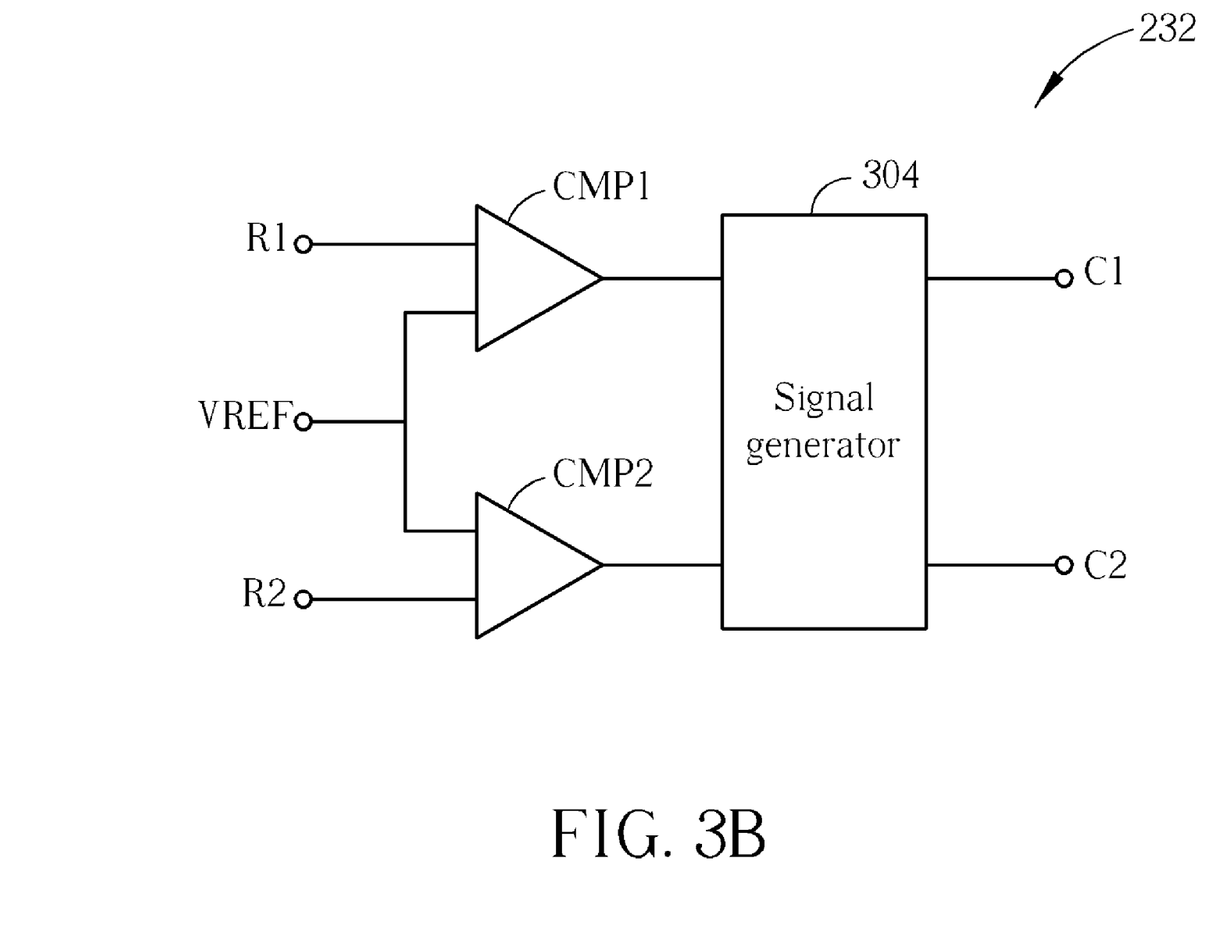
FIG. 3B is a schematic diagram of a control device shown in FIG. 2.

Besides, the control device 232 can be implemented with any elements, as long as the control device 232 controls the first charging circuit 218 and the second charging circuit 230 according to the first sensing result R1 and the second sensing result R2. For example, FIG. 3B is a schematic diagram of an embodiment of the control device 232. In FIG. 3B, the control device 232 includes comparators CMP1, CMP2 and a signal generator 304. The comparators CMP1 and CMP2 compare the first sensing result R1 and the second sensing result R2 with a reference signal VREF, and the signal generator 304 generates the first control signal C1 and the second control signal C2 according to the comparison results of the comparators CMP1 and CMP2. Under certain condition, the comparison results of the comparators CMP1 and CMP2 can be taken as the first control signal C1 and the second control signal C2, to reduce the signal generator 304. Note that, FIG. 3B is merely utilized for illustrating one of the possible implementations of the control device 232, and those skilled in the art can also realize the control device 232 with hardware circuits, firmware, software, etc. according to system requirements. For example, if the control device 232 is realized by firmware, program code can be stored in a keyboard controller, to achieve the function of the control device 232. Furthermore, the control device 232 is installed in the dock 202 in FIG. 2; in fact, the control device 232 can also be installed in the host 200.

As can be seen from the above, the portable computer system 20 includes two usable power sockets (the first power socket 210 and the second power socket 222), meaning that the present invention does not need an "anti-crash" mechanism to block one of the power sockets. Under such condition, when a user operates the portable computer system 20 or charge the portable computer system 20 with an external power source, i.e. the transformer, the user can insert the transformer into the first power socket 210 or the second power socket 222 at will, and the control device 232 can control operations of the first charging circuit 218 and the second charging circuit 230 according to the first sensing result R1 or the second sensing result R2, to avoid the transformer burning out due to overload. Therefore, the present invention can enhance convenience, and maintain normal operation of the system. Furthermore, since the control device 232 installed in the dock 202 controls the first charging circuit 218 of the host 200 via the first sensing result R1 and the first control signal C1, the only high-voltage signal transmitted between the dock 202 and the host 200 is DC power transmitted between the first power terminal 208 and the second power terminal 220, such that the user is prevented from touching the high-voltage terminal in the connector, in order to avoid circuit short, decrease unnecessary risk and enhance reliability.

In FIG. 2, the power storage device 206 and the dock 202 can be taken as a dual-battery power supply device, from which a multi-battery power supply device can be derived. Please refer to FIG. 4, which is a schematic diagram of a power supply device 40 according to an embodiment of the present invention. The power supply device 40 is utilized for supplying power for a host 400 of an electronic device, and includes power storage devices PST_1~PST_n and a control device 402. Structures and operations of the power storage devices PST_1~PST_n are similar to those of the power storage device 206 shown in FIG. 2; for example, the power storage device PST_1 includes a power terminal T_1, a power socket R_1, a current sensing circuit CSC_1, a rechargeable battery BT_1, a switch SW_1 and a charging circuit CHR_1. The current sensing circuit CSC_1 senses current from the power socket R_1 to the power terminal T_1, to generate a sensing result SR_1 to the control device 402. Accordingly, the control device 402 can output control signals CTR_1—CTR_n to charging circuits CHR_1—CHR_n based on the sensing results SR_1~SR_n generated by the power storage devices PST_1—PST_n, to control corresponding charging operations. For example, when a sensing result SR_x indicates that current flowing from a corresponding power socket R_x to a corresponding power terminal T_x is greater than a default value, the control device 402 can control charging circuits of power storage devices other than the power storage device PSD_x to decrease power supply, or decrease power consumption of the host 400, to avoid overload of the transformer.

Noticeably, the power supply device 40 is derived from the portable computer system 20 shown in FIG. 2, so detailed operations or alterations can be referred to the above. For example, the control device 402 can be realized by hardware circuits, firmware, software, etc., and is preferably installed in an external power storage device connected to the electronic device by means of insertion. Besides, similar to FIG. 3, conversion circuits can be added between the current sensing circuits CSC_1~CSC_n and the control device 402, for converting sensing results SR_1~SR_n, or be integrated into the charging circuits CHR_1—CHR_n, to enhance layout efficiency.

Figure 4:
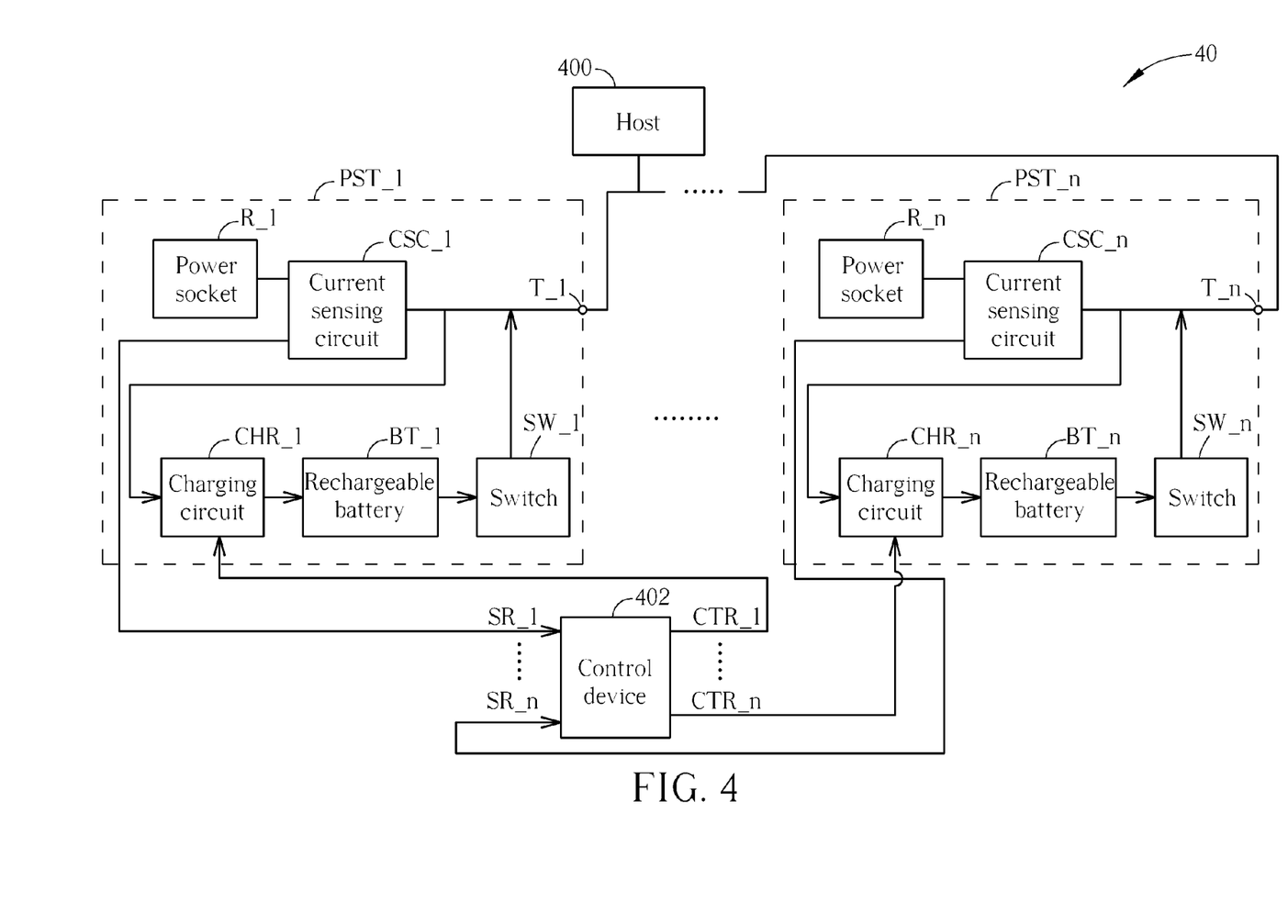
FIG. 4 is a schematic diagram of a power supply device according to an embodiment of the present invention.
Figure 5:
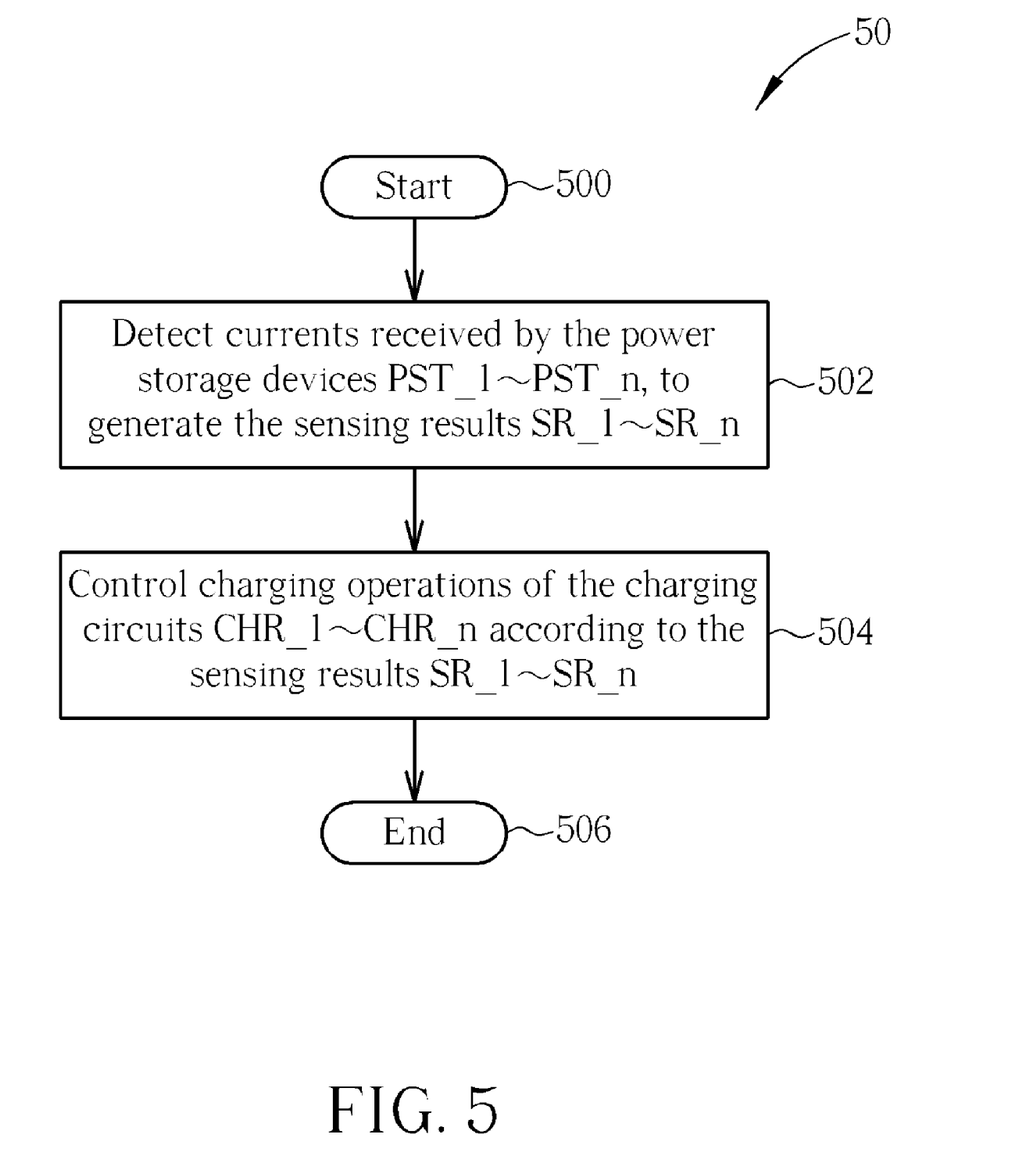
FIG. 5 is a schematic diagram of a charging process according to an embodiment of the present invention.

Furthermore, operations of the power supply device 40 can be summarized in a charging process 50, as shown in FIG. 5. The charging process 50 includes the following steps:

Step 500: Start.

Step 502: Detect currents received by the power storage devices PST_1~PST_n, to generate the sensing results SR_1~SR_n.

Step 504: Control charging operations of the charging circuits CHR_1~CHR_n according to the sensing results SR_1~SR_n.

Step 506: End.

Detailed description of the charging process 50 can be referred to above, and is not narrated herein for simplicity.

To sum up, the present invention controls the charging operations of the charging circuits according to the current sensing results, to avoid the transformer overloading, such that the anti-crash mechanism for blocking the power sockets is not required. Besides, high-voltage signals transmitted between the dock and the host can be reduced, so as to decrease unnecessary risk. Therefore, the present invention can not only enhance convenience, but also maintain normal operation.

Those skilled in the art will readily observe that numerous modifications and alterations of the device and method may be made while retaining the teachings of the invention.

What is claimed is:

1. A portable computer system, comprising:
a host, comprising an operating circuit;
a power storage device, installed in the host, comprising:
  a first power terminal, coupled to the operating circuit;
  a first power socket, for being inserted a transformer;
  a first current sensing circuit, coupled between the first power socket and the first power terminal, for sensing current from the first power socket to the first power terminal, to generate a first sensing result;
  a first rechargeable battery;
  a first switch, coupled between the first rechargeable battery and the first power terminal, for switching connection between the first rechargeable battery and the first power terminal according to a power capacity of the first rechargeable battery; and
  a first charging circuit, coupled to the first power terminal and the first rechargeable battery, for charging the first rechargeable battery according to a first control signal; and
a dock, capable of connecting to the host by means of insertion, comprising:
  a second power terminal, coupled to the operating circuit;
  a second power socket, for being inserted the transformer;
  a second current sensing circuit, coupled between the second power socket and the second power terminal, for sensing current from the second socket to the second power terminal, to generate a second sensing result;
  a second rechargeable battery;
  a second switch, coupled between the second rechargeable battery and the second power terminal, for switching connection between the second rechargeable battery and the second power terminal according to a power capacity of the second rechargeable battery;
  a second charging circuit, coupled to the second power terminal and the second rechargeable battery, for charging the second rechargeable battery according to a second control signal; and
  a control device, coupled to the first current sensing circuit, the first charging circuit, the second current sensing circuit and the second charging circuit, for outputting the first control signal and the second control signal according to the first sensing result and the second sensing result, to control the first charging circuit and the second charging circuit;
wherein the control device is utilized for controlling the second charging circuit to decrease power supply for the second rechargeable battery when the first sensing result indicates that the current from the first power socket to the first power terminal is greater than a default value.

2. The portable computer system of claim 1, wherein the control device is further utilized for decreasing power consumption of the operating circuit when the first sensing result indicates that the current from the first power socket to the first power terminal is greater than the default value.

3. The portable computer system of claim 1, wherein the control device is utilized for controlling the first charging circuit to decrease power supply for the first rechargeable battery when the second sensing result indicates that the current from the second power socket to the second power terminal is greater than a default value.

4. The portable computer system of claim 3, wherein the control device is further utilized for decreasing power consumption of the operating circuit when the second sensing result indicates that the current from the second power socket to the second power terminal is greater than the default value.

5. The portable computer system of claim 1, wherein the first power storage device further comprises a conversion circuit, for converting the first sensing result.

6. The portable computer system of claim 5, wherein the conversion circuit is integrated in the charging circuit.

7. The portable computer system of claim 1, wherein the second power storage further comprises a conversion circuit, for converting the second sensing result.

8. The portable computer system of claim 7, wherein the conversion circuit is integrated in the charging circuit.

9. The portable computer system of claim 1, wherein the control device is realized by firmware.

10. A power supply device for an electronic device, comprising:
a plurality of power storage devices, each power storage device comprising:
  a power terminal, coupled to a host of the electronic device;
  a power socket, for being inserted a transformer;
  a current sensing circuit, coupled between the power socket and the power terminal, for sensing current from the power socket to the power terminal, to generate a sensing result;
  a rechargeable battery;
  a switch, coupled between the rechargeable battery and the power terminal, for switching connection between the rechargeable battery and the power terminal according to a power capacity of the rechargeable battery; and
  a charging circuit, coupled to the power terminal and the rechargeable battery, for charging the rechargeable battery according to a control signal; and
a control device, coupled to a plurality of current sensing circuits and a plurality of charging circuits of the plurality of power storage devices, for outputting a plurality of control signals according to a plurality of sensing results of the plurality of current sensing circuits, to control the plurality of charging circuits;

wherein when a sensing result of a first power storage device among the plurality of power storage devices indicates that current from a corresponding power socket to a corresponding power terminal is greater than a default value, the control device is utilized for controlling charging circuits of power storage devices other than the first power storage device to decrease power supply.

11. The power supply device of claim 10, wherein the control device is further utilized for decreasing power consumption of the host when the sensing result of the first power storage device indicates that the current from the corresponding power socket to the corresponding power terminal is greater than the default value.

12. The power supply device of claim 10, wherein the control device is installed in a specific power storage device of the plurality of power storage devices, and the specific power storage device is installed in the electronic device by means of insertion.

13. The power supply device of claim 10, wherein the each power storage device further comprises a conversion circuit, for converting the sensing result.

14. The power supply device of claim 13, wherein the conversion circuit is integrated in the charging circuit.

15. The power supply device of claim 10, wherein the control device is realized by firmware.

16. The power supply device of claim 10, wherein the electronic device is a computer system.

17. A charging method for an electronic device, the electronic device comprising a plurality of power storage devices, the charging method comprising:

detecting current received by each power storage device of the plurality of power storage devices, to generate a plurality of sensing results; and controlling charging operations of the plurality of power storage devices according to the plurality of sensing results, comprising:

controlling the charging operations of the plurality of power storage devices according to the plurality of sensing results is decreasing currents received by power storage devices other than a first power storage device when a sensing result indicates that current received by the first power storage device is greater than a default value.

18. A portable computer system, comprising:
a host, comprising an operating circuit;
a power storage device, installed in the host, comprising:
a first power terminal, coupled to the operating circuit;
a first power socket, for being inserted a transformer;
a first current sensing circuit, coupled between the first power socket and the first power terminal, for sensing current from the first power socket to the first power terminal, to generate a first sensing result;
a first rechargeable battery;
a first switch, coupled between the first rechargeable battery and the first power terminal, for switching connection between the first rechargeable battery and the first power terminal according to a power capacity of the first rechargeable battery; and
a first charging circuit, coupled to the first power terminal and the first rechargeable battery, for charging the first rechargeable battery according to a first control signal; and a dock, capable of connecting to the host by means of insertion, comprising:
a second power terminal, coupled to the operating circuit;
a second power socket, for being inserted the transformer;
a second current sensing circuit, coupled between the second power socket and the second power terminal, for sensing current from the second socket to the second power terminal, to generate a second sensing result;
a second rechargeable battery;
a second switch, coupled between the second rechargeable battery and the second power terminal, for switching connection between the second rechargeable battery and the second power terminal according to a power capacity of the second rechargeable battery;
a second charging circuit, coupled to the second power terminal and the second rechargeable battery, for charging the second rechargeable battery according to a second control signal; and
a control device, coupled to the first current sensing circuit, the first charging circuit, the second current sensing circuit and the second charging circuit, for outputting the first control signal and the second control signal according to the first sensing result and the second sensing result, to control the first charging circuit and the second charging circuit;

wherein the control device is utilized for controlling the first charging circuit to decrease power supply for the first rechargeable battery when the second sensing result indicates that the current from the second power socket to the second power terminal is greater than a default value.

* * * * *